(12) United States Patent
Poubel Orenstein

(10) Patent No.: US 11,794,732 B2
(45) Date of Patent: Oct. 24, 2023

(54) ALLOCATION OF SAFETY SYSTEM RESOURCES BASED ON PROBABILITY OF INTERSECTION

(71) Applicant: Zoox, Inc., Foster City, CA (US)

(72) Inventor: Leonardo Poubel Orenstein, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 246 days.

(21) Appl. No.: 17/090,712

(22) Filed: Nov. 5, 2020

(65) Prior Publication Data

US 2022/0135029 A1 May 5, 2022

(51) Int. Cl.
*B60W 30/09* (2012.01)
*B60W 30/095* (2012.01)
*B60R 21/0132* (2006.01)
*G08G 1/16* (2006.01)

(52) U.S. Cl.
CPC ..... *B60W 30/0956* (2013.01); *B60R 21/0132* (2013.01); *B60W 30/0953* (2013.01); *G08G 1/166* (2013.01); *B60W 2420/90* (2013.01); *B60W 2520/10* (2013.01); *B60W 2554/00* (2020.02)

(58) Field of Classification Search
CPC ............. B60W 30/00; B60W 30/0953; B60W 30/0956; B60W 30/18154; B60W 50/0097; B60W 60/00274; B60W 60/00276; B60W 2420/90; B60W 2520/06; B60W 2520/10; B60W 2520/14; B60W 2520/16; B60W 2520/18; B60W 2554/00; B60W 2554/4042; B60W 2554/4045; B60W 2554/80; B60W 2555/60; B60W 2556/10; B60W 2556/50; G05D 1/0088; G05D 1/0214; G05D 2201/0213

See application file for complete search history.

(56) References Cited

U.S. PATENT DOCUMENTS

| 2010/0191391 | A1 | 7/2010 | Zeng | |
|---|---|---|---|---|
| 2018/0141544 | A1* | 5/2018 | Xiao | G05D 1/0212 |
| 2019/0152490 | A1* | 5/2019 | Lan | B60W 60/00276 |
| 2019/0243371 | A1* | 8/2019 | Nister | G05D 1/0242 |
| 2021/0001860 | A1* | 1/2021 | Kawasaki | B60W 50/14 |

FOREIGN PATENT DOCUMENTS

GB 2570887 A 8/2020

OTHER PUBLICATIONS

International Search Report and Written Opinion for PCT Application No. PCT/US2021/056115, dated Jan. 20, 2022, 10 pages.

* cited by examiner

*Primary Examiner* — Peter D Nolan
*Assistant Examiner* — Ce Li Li
(74) *Attorney, Agent, or Firm* — Lee & Hayes, P.C.

(57) ABSTRACT

Techniques for predicting and avoiding collisions with objects detected in an environment based on sensor data are discussed herein. Sensors of a vehicle may detect one or more objects in the environment. A model may determine intersection values indicative of probabilities that the object will follow different paths that intersect with a planned path of the vehicle. A vehicle may receive one or more intersection values from a model usable by a computing device to control the vehicle.

20 Claims, 7 Drawing Sheets

ALLOCATION OF SAFETY SYSTEM RESOURCES BASED ON PROBABILITY OF INTERSECTION

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, or the like. The planning systems may perform any number of operations (e.g., simulations, etc.) to determine an effect of each detected object on a potential action for the vehicle. However, in environments with a large number of objects, performing such operations on each detected object may be computationally costly and, in some cases, impossible with onboard computing capabilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
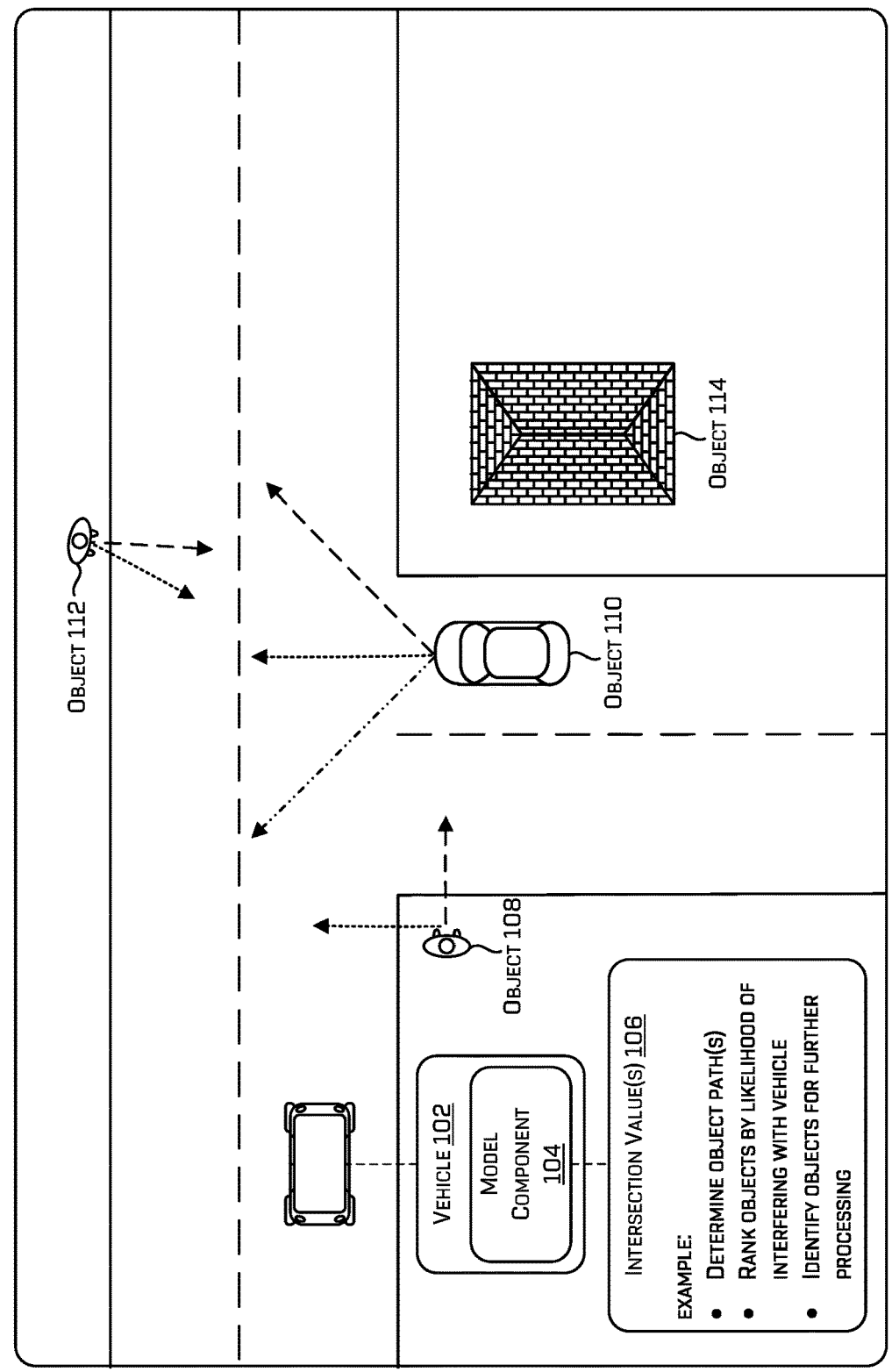
FIG. 1 is an illustration of an example environment, in which an example vehicle applies a model to predict an intersection value indicating a likelihood for collision with one or more example objects.

This disclosure relates to techniques for predicting and avoiding collisions with objects detected in an environment of a vehicle and determining which objects should be further processed. The vehicle may be an autonomous vehicle including one or more sensors to detect objects in the environment. In some examples, a vehicle safety system may receive state data associated with an object and use the state data to determine probabilities that the object will follow different paths that intersect with a planned path of the vehicle. Possible collision points and/or intersection times between the vehicle and the object may be determined based on vehicle information (e.g., a current trajectory of the vehicle, a current speed of the vehicle, a planned path of the vehicle, etc.) and object information (a current trajectory and/or speed of the object, one or more predicted trajectories and/or speeds of the object). In various examples, the vehicle safety system may implement a model that receives, as in input, the probabilities that the object will follow different paths, possible collision points, and/or possible intersection times, and outputs a probability that the vehicle and the object intersect in the environment in the future. Using the techniques described herein, a vehicle may receive intersection values from a model usable by the vehicle to quickly verify that a planned path of the vehicle will not result in an intersection with an object, thereby improving safety of the vehicle.

Generally, the model may provide functionality of an attention system for the vehicle safety system by identifying objects with a highest probability of colliding or otherwise interfering with the vehicle so that the vehicle safety system can allocate processing resources to the objects most likely to collide or otherwise interfere with the vehicle. Accordingly, in some examples, the model may be configured to identify objects having different probabilities of interfering with the vehicle and provide different levels of further processing for the objects (e.g., the objects having the highest probability of collision with the vehicle may undergo additional and/or more computationally intensive processing (e.g., simulations, estimated states, interaction modeling, collision estimation, etc.) relative to objects having lower probabilities of interfering with the vehicle). In this way, the vehicle safety system is configured to devote more processing resources to the objects highest probability of colliding or otherwise interfering with the vehicle. In some examples, the vehicle computing device may control the vehicle in the environment based at least in part on receiving one or more instructions representative of output(s) from the model.

In some examples, techniques for predicting and avoiding collisions as described herein can be implemented as part of a vehicle safety system running on a resource constrained platform (e.g., processor and/or memory capacity is limited). In such examples, the model can perform multiple separate operations that are relatively easy to calculate (e.g., predicting probabilities that the object will take one of multiple paths), limit computations to a finite number of possible collision locations and times, and determine probabilities of an intersection with an object at the possible intersection locations and times. In this way, the model can output intersection values that act as a filter to determine which objects are further processed by more process intensive models or components. This resource savings means that more processing resources can be devoted to the objects having highest probability of colliding or otherwise interfering with the vehicle.

In some examples, the techniques for determining intersection values associated with object(s) in an environment can include applying and/or training a model to predict or otherwise determine a likelihood that the object(s) will intersect with the vehicle. In some complex environments, it may be difficult to distinguish between an object that may impact operation of the vehicle (e.g., potential for collision or to cause the vehicle to change trajectory to avoid the object) and an object that may not impact operation of the vehicle. By determining a probability for an object to collide with the vehicle using the techniques described herein, a computing device may direct available computation resources to the most relevant objects (e.g., objects having a higher likelihood for impacting operation of the vehicle). In some examples, a computing device may, based on one or more outputs from the model, direct available computational resources to the most relevant objects during vehicle planning thereby improving vehicle safety as the vehicle navigates in the environment. In addition, by dedicating less computational resources to less relevant objects, models and/or components (e.g., a vehicle safety system, a planning component, and so on) have more computational resources available to devote to predicting possible collisions for the most relevant objects and/or determining responses to avoid or mitigate such predicted collisions.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine state data usable by the model to predict potential for an intersection with the object along a path.

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as separate system that receives state data (e.g., perception data) based on the sensor data and AI techniques implemented by the primary system (e.g., vehicle computing device), and may perform various techniques described herein for improving collision prediction and avoidance by the vehicle.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

In some examples, the vehicle safety system may determine state data associated with the object at a current time (e.g., a first time). For example, state data may comprise one or more of: position data, velocity data, and yaw rate data associated with the object. In various examples, the vehicle safety system may determine one or more possible headings of the object based on the yaw rate data. In some examples, the vehicle safety system may determine one or more paths for the object to intersect with the vehicle based on the yaw rate data and position data indicating a current position of the object. In at least some examples, such one or more paths may be determined based at least in part on a level of uncertainty associated with a nominal path predicted by another component of the vehicle. As a non-limiting examples, such a nominal predicted path may be associated with an uncertainty in yaw (or heading) of about 5 degrees and a plurality of paths may be determined to be linearly, non-linearly, or otherwise distributed over the range of potential paths within the uncertainty of the nominal path.

By way of example and not limitation, to enable the vehicle to respond quickly and accurately to objects, the model may send intersection information (e.g., intersection value(s) indicative of how likely the object is to collide with the vehicle, objects ordered by probability to collide, relevant objects, non-relevant objects, etc.) to a planning component configured to plan a trajectory for the vehicle and/or to a perception component configured to sense the environment. In this way, intersection values from the model can be considered during planning operations (e.g., to avoid the object) and/or to during perception operations (e.g., to direct one or more sensors to capture higher levels of perception for relevant objects and/or less levels of perception for less relevant objects).

In some examples, the vehicle safety system may determine, for each of the one or more paths, a probability that the object follows the respective path. For instance, the model may receive, as input, the state data associated with the object, and output a value indicating a likelihood that the object follows the path. In some examples, the probability may be based at least in part on dynamics given a current state of the object, and in some instances a previous state of the object. For example, a first value output by the model may indicate a 90% likelihood that the object will follow a first path and a second value output by the model may indicate a 70% likelihood that that the object will follow a second path different from the first path. In various examples, a model separate from the vehicle safety system (e.g., a vehicle computing device) can provide data representing a path and/or likelihoods that an object will follow a particular path to the vehicle safety system.

In some examples, a vehicle safety system may determine, for each of the one or more paths, intersection point(s) between the vehicle trajectory and each respective path. In some examples, the vehicle safety system may determine, for each of the one or more paths, intersection time(s) for the vehicle and the object to intersect in the future. For instance, the vehicle safety system may receive a trajectory of the vehicle from a planning component and compute the intersection point(s) and/or the intersection time(s) based at least in part on trajectory of the vehicle. Additional details for determining intersection points and/or intersection times are described herein, including in relation to FIGS. 3, 4A, and 4B.

In some examples, an input for the model may comprise one or more of: the probability(ies) that the object will follow a path (or additional paths), the one or more intersection points, the one or more intersection times, uncertainty value(s), and/or the state data. In some examples, a collision space may be determined by the vehicle safety system, and further be used as an input to the model. The collision space may represent a collision region defined by a first point of intersection of the vehicle trajectory and the path assuming a first velocity of the object (e.g., a minimum velocity), and a second point of intersection of the vehicle trajectory and the path assuming a second velocity of the object (e.g., a maximum velocity).

In various examples, the model may provide an output based at least in part on any one or more of the aforementioned inputs. To illustrate, consider the following non-limiting example in which a vehicle navigates an environment and detects a dynamic object, such as a pedestrian. In such an example, the state data may indicate a position of the pedestrian relative to the vehicle and a heading of the object based on the yaw rate data. The computing device may determine multiple paths that the pedestrian may follow, and intersection points along each of the multiple paths, for use in determining an overall probability for whether or not an intersection between the pedestrian and the vehicle will occur. In various examples, the overall probability for an intersection of the pedestrian may be ranked or otherwise ordered by importance relative to other objects processed by the model (e.g., the model may indicate that the pedestrian is more likely to intersect with the vehicle than another object, such as a vehicle which has a lower associated intersection value output by the model).

As previously mentioned, the intersection values output by the model may be used in a variety of ways. For instance, one or more values from the model may be used by a vehicle computing device to determine a vehicle action (e.g., control the vehicle, adjust a sensor, determine perception data, and so on). In some examples, controlling the vehicle may comprise stopping the vehicle, determining a trajectory for the vehicle to follow in the environment, and/or controlling at least one of: a braking system, an acceleration system, or a drive system of the vehicle.

In some examples, the vehicle computing device may determine a different level of perception in a region in which the model outputs a high confidence that an object is likely to impact operation of the vehicle (as indicated by the associated intersection values). For instance, if there is a high confidence that an object (e.g., another vehicle, a bicyclist, a motorcycle, a truck, and so on) is on a path to collide with the vehicle based on an intersection value output from the model, then a perception component of the vehicle can be modified to focus one or more sensors in an area of the object. As another non-limiting example, the vehicle computing device may determine a different level of perception such as initiating perception functionality by a model to detect sudden movements or erratic behavior by the object. By heightening perception based on the intersection values, the vehicle can more safely navigate in an environment compared to not implementing the model. In any such examples, additional models may be used, more complex models may be used, redundant models may be used, or the like.

A vehicle computing system may allocate an amount of memory, a type of memory, and/or a memory location to make the best use of available memory resources to models that predict possible object collisions. In some examples, models may make use of memory resources that are remote from the vehicle (e.g., a remote server or a remote vehicle). Detected objects that are determined to have no impact on operation of the vehicle may be associated with a model that performs different prediction processing (e.g., accessing fewer available memory resources) thereby enabling more memory resources to be available to models that correspond to objects having a higher likelihood of impacting operation of the vehicle.

In some examples, a model may define processing resources (e.g., processor amount, processor cycles, processor cores, processor location, processor type, and the like) to use to predict whether an object path will likely intersect with the vehicle. A vehicle computing system that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection values by processing the object using a GPU, CPU, or a combination thereof. In this way, each model may be defined to utilize the processing resources that enable the model to perform predictions in the least amount of time (e.g., to use the intersection values in planning considerations of the vehicle). Accordingly, models may be allocated to objects to make the best use of available processing resources and enable more predictions that may improve how a vehicle navigates in relation to the objects.

The techniques discussed herein can improve a functioning of a computing device of a vehicle in a number of ways. For example, the model may act as an attention system (e.g., a vehicle safety system and/or a redundancy to an existing perception component) that identifies and/or prioritizes objects for further processing by a vehicle computing device. In some examples, the attention system may be separate from a main vehicle computing device (e.g., the model may be included as part of a vehicle safety system 534 independent of vehicle computing device 504). The techniques can include the model optimizing available computational resources by performing operations that limit the impact on the available resources (as compared to not implementing the model). Utilizing intersection values by a vehicle computing device, for instance, can improve the accuracy and/or reduce a latency for the vehicle to respond to a potential collision in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Further, although discussed in the context of emergency vehicle(s) or sounds associated with such emergency vehicle(s), the techniques can be applicable to any type or category of sound and are not limited to specific examples discussed herein. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example collision model (model component 104) may determine one or more intersection values (intersection value(s) 106). A vehicle computing device (e.g., vehicle computing device 504) and/or a vehicle safety system (e.g., vehicle safety system 534) may implement the classification model of the vehicle 102. While described as a separate system, in some examples, classification techniques described herein may be implemented by other vehicle systems, components, and/or computing devices. For example, and as will be described in further detail with regard to FIG. 5, the intersection information techniques described herein may be implemented at least partially by or in association with a localization component 520, a perception component 522, and/or a planning component 524.

In various examples, the vehicle safety system may be configured to receive sensor data representing object(s) of the environment 100, such as via a perception component (e.g., the perception component 522). In some examples, the vehicle safety system may detect, infer, estimate, or otherwise determine state data representing characteristics of the object in the environment 100. In some examples, the sensor(s) may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100.

In some examples, the vehicle safety system may be configured to detect an object in the environment 100, such as object 108 (e.g., a pedestrian), object 110 (e.g., a vehicle), object 112 (e.g., a pedestrian), and object 114 (e.g., a building). In some examples, the vehicle safety system may be configured to receive, detect, infer, estimate, or otherwise determine one or more paths for each detected object. As shown in FIG. 1, each of the pedestrian 108, the vehicle 110, and the pedestrian 112 are associated with two or more paths (e.g., object path #1, object path #2, and so on) determined by the vehicle safety system (e.g., using the model component 104 or another model). Each path may be associated with a value to indicate a probability that the object will follow the path. For instance, the model component 104 may output a first value to indicate a first probability that the vehicle 110 follows the first path, a second value to indicate a second probability that the vehicle 110 follows the second path, a third value to indicate a third probability that the vehicle 110 follows the third path, and so on for any number of paths. In some examples, the model component 104 may receive path information and/or probabilities associated with an object following a path from a machine learned model. In at least some examples, an uncertainty may be associated with such a path and one or more paths may be determined distributed linearly or non-linearly about the nominal path based at least in part on the associated uncertainty.

In some examples, the model component 104 may determine intersection value(s) 106 for one or more paths associated with each of two or more objects, such as the pedestrian 108 and the vehicle 110. In such examples, the intersection values 106 output by the model component 104 may indicate whether the pedestrian 108 or the vehicle 110 is associated with a higher likelihood to impact operation of the vehicle 102. In this way, a planning component of the vehicle computing device (e.g., planning component 524) may receive instructions from the model component 104 for use in planning operations.

In some examples, a vehicle safety system may rank objects by likelihood of colliding with the vehicle 102, and in some examples apply other models or components to process a higher ranked object differently than a lower ranked object. For instance, less computational power may be used by a model to process the pedestrian 112 as compared to the pedestrian 108 based at least in part on the intersection value of the pedestrian 112 being lower than the intersection value of the pedestrian 108.

In some examples, and as discussed further in FIG. 2 and elsewhere, any one of the object paths may represent a substantially straight line. However, in other examples, the vehicle safety system may determine curved paths for detected objects. Additional detail for determining and utilizing intersection values 106 are discussed throughout this disclosure.

In some examples, a vehicle computing device may control the vehicle 102 in the environment based at least in part on one or more intersection values 106. For instance, the model component 104 may provide functionality of an attention system for the vehicle 102 by identifying objects most likely to cause an intersection and communicating intersection information about the identified objects to other components of the vehicle computing device. Accordingly, the intersection value may be taken into account in operations (e.g., simulations, estimated states, interaction modeling, collision estimation, etc.) or other vehicle control planning operation.

Figure 2A:
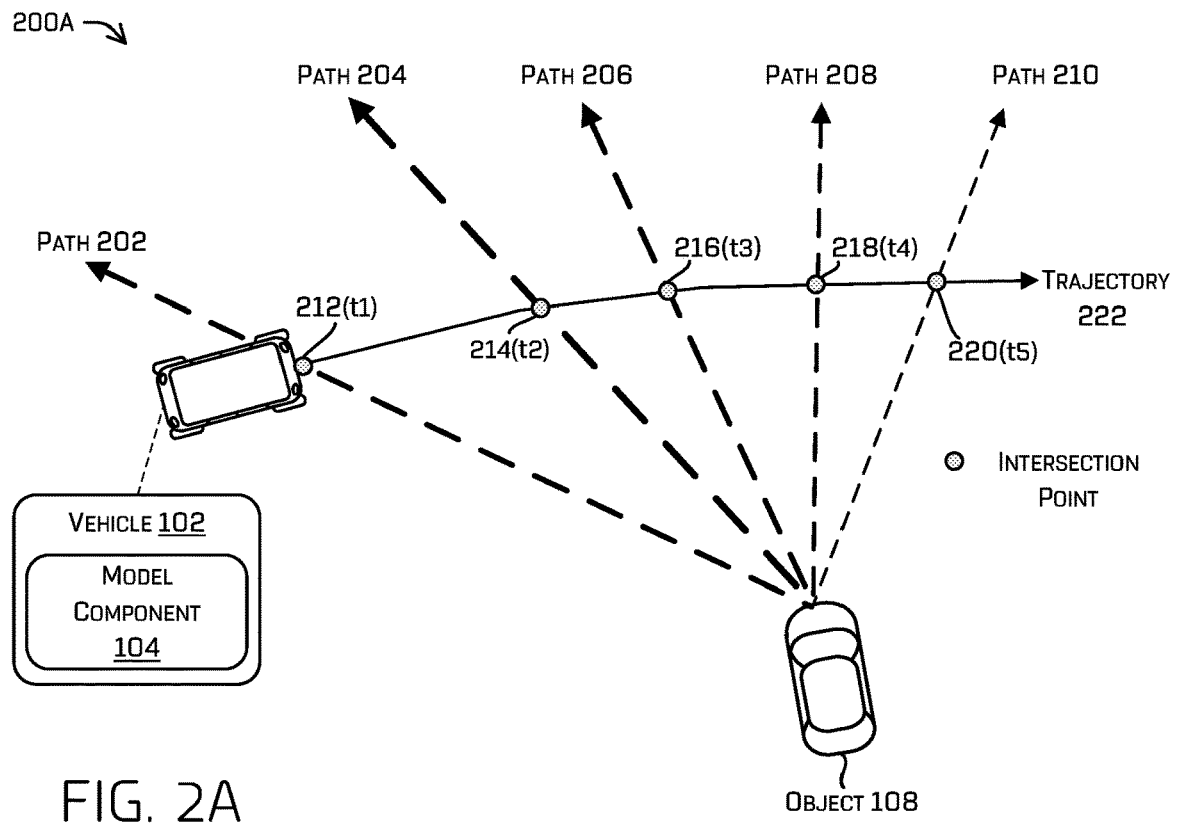
FIG. 2A is an illustration of another example environment, in which one or more models determine an intersection point and an intersection time between a vehicle and an object.

FIG. 2A is an illustration of an example environment 200A, in which one or more models determine an intersection point and an intersection time between a vehicle and an object. For instance, an example vehicle computing device (e.g., vehicle computing device 504) and/or an example vehicle safety system (e.g., vehicle safety system 534) may determine an intersection point and an intersection time between a vehicle (vehicle 102) and an object (object 108) based on an intersection value (intersection value(s) 106) from an example model (model component 104).

FIG. 2A illustrates the object 108 (e.g., the vehicle 108) associated with multiple different paths (e.g., 202, 204, 206, 208, and 210). Generally, one or more of path 202, path 204, path 206, path 208, and path 210 may represent a geometric position that the vehicle 108 may follow through space, without temporal information. The vehicle computing device may determine each of the paths based at least in part on state data of the vehicle 108. For instance, one or more of path 202, path 204, path 206, path 208, and path 210 may be determined based on a yaw angle of the vehicle 108 (e.g., an angle of the object relative to a fixed frame). In some examples, a path may be determined based at least in part on a yaw rate (e.g., a change in yaw over time). In various examples, one or more of the multiple different paths may represent a curve in addition to or instead of a straight path.

For a given path, the vehicle safety system may, in various examples, determine one or more collision points (e.g., a point in space at which the object and the vehicle 102 overlap and/or intersect) such as collision points 212, 214, 216, 218, and 220. Each of the collision points 212, 214, 216, 218, and 220 may be associated with a different time. In some examples, multiple collision points may be determined for a given path.

In some examples, the vehicle safety system may determine, for a given path, one or more intersection times such as intersection time t1 associated with collision point 212, intersection time t2 associated with collision point 214, intersection time t3 associated with collision point 216, intersection time t4 associated with collision point 218, and intersection time t5 associated with collision point 220. The intersection time may represent a time from a current time (t0) at which the vehicle 108 and the vehicle 102 overlap and/or intersect.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle 102 at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle safety system may determine the collision point and/or the intersection time based at least in part on a trajectory (e.g., direction, speed, acceleration, etc.) associated with the vehicle 102. For instance, a planning component (e.g., the planning component 524) may send a planned trajectory of the vehicle 102 to the model component 104. In various examples, an intersection time may represent a change in time from the current time to a time associated with the trajectory of the vehicle 102 when the overlap occurs with the vehicle 108. In this way, the collision point and/or intersection time may be determined based at least in part on an interpolation between the object path (without temporal information) and time information associated with the vehicle 102. In some instances, the trajectory of the vehicle 102 may be represented as a series of line segments and associated with one or more positions, velocities, accelerations, or other desired states. Additional details regarding determining collision points and/or intersection times are discussed throughout this disclosure.

In at least one example, the vehicle safety system may determine, for each of the one or more paths, a probability that the vehicle 108 follows the respective path. For instance, the model component 108 may receive, as input, the state data associated with the vehicle 108, and output a value indicating a likelihood that the object follows the path. In some examples, the probability may be based at least in part on dynamics given a current and previous states of the vehicle 108. As shown in FIG. 2A, values indicating a likelihood that the object follows the path 202, path 204, path 206, path 208, and path 210 may be represented by different levels of shading. For example, a value output by the model component 104 may indicate a 90% likelihood that the vehicle 108 will follow the path 204 and another value output by the model component 104 may indicate a 70% likelihood that that the vehicle 108 will follow the path 206.

In some examples, an input for the model component 104 may comprise one or more of: the probability(ies) for the vehicle 108 to follow at least one of the paths, the one or more collision points, the one or more intersection times, and/or state data.

In various examples, the model may provide an output based at least in part on any one or more of the aforementioned inputs. For instance, the vehicle safety system may determine an overall probability for whether or not an intersection between the vehicle 108 and the vehicle 102 will occur. In various examples, the overall probability for an intersection with the vehicle 108 may be ranked or otherwise ordered by importance relative to another object processed by the model component 104, such as a pedestrian.

In some examples, the model component 104 may identify, detect, analyze, or otherwise determine a probability for an intersection between the vehicle 108 and the vehicle 102 independent of which path the object follows in the future. For instance, probability for the collision may take into account each probability associated with each path, as well as potential collision points and intersection times.

In some examples, to determine the probability for an intersection, the vehicle safety system may determine a collision region for a path to represent a space at which a given state representation (e.g., a velocity) of the vehicle 108 would cause a collision. For instance, for a particular path, the vehicle safety system may determine a velocity (e.g., an instantaneous velocity) for the vehicle 108 to collide with the vehicle 102 based at least in part on the one or more equations of motion. In some examples, the vehicle safety system may determine a probability of the object being in the collision region for the path according to the state representation (e.g., map an object state at a current time to the collision region). In such examples, the probability for the collision may be based at least in part on a first probability of the vehicle 108 being in a first collision region for the path 202, a second probability of the vehicle 108 being in a second collision region for the path 204, and so on. In various examples, the probability for the collision determined by the model component 104 may be further based at least in part on a third probability of the vehicle 108 following the path 202, a fourth probability of the vehicle 108 following the path 204, and so on.

In some examples, the model component 104 may determine the probability for an object path to intersect with a trajectory of the vehicle 102 based at least in part on one or more uncertainty values associated with one or more of: an object position, an object acceleration, an object velocity, an acceleration of the vehicle, etc. For instance, uncertainty values may be determined to account for deviations in position, velocity, and/or acceleration that the object and/or the vehicle may follow at a future time. In at least some examples, such uncertainties may be associated with errors in the models for perception and/or prediction.

In some examples, an uncertainty value may be determined to account for a deviation in velocity that the object may follow at a future time, and may be expressed by the following equation:

$$e_v^{collision} = \sqrt{\left(\frac{\sigma_s}{t^{collision}}\right)^2 + (t^{collision} * \sigma_a)^2} \quad (1)$$

Here, $\sigma_s$ represents an uncertainty in a position of that the object can have at a future time, and $\sigma_a$ represents an uncertainty in an acceleration that the object can have at a future time. The uncertainty value may be used, for instance, as an input to a model that determines a probability of the object and the vehicle intersecting at the future time.

In some examples, the uncertainty value may be associated with a heading of the object and may represent one of many inputs into a model that defines, generates, or otherwise determine a path that the object can take in the future (e.g., bounds of the path may be defined based at least in part on the uncertainty value associated with the heading of the object). For instance, the heading of the object may be determined from sensor data associated with a sensor that detects a current heading of one or more objects proximate the vehicle. Any uncertainty associated with capturing the heading of the object (e.g., or data associated therewith) by the sensor of the vehicle can be communicated to the vehicle safety system for input into the model component 104.

In some examples, the model component 104 (or other model) can receive an uncertainty value(s) representing an uncertainty associated with one or more of: a heading of the object, a velocity of the object, a position of the object, an acceleration of the object, a trajectory of the vehicle, and the like. In such examples, the model component 104 (or the other model) can output data representing a likelihood of whether the object will intersect with the vehicle in the future based at least in part on the uncertainty values(s). By way of example and not limitation, the model component 104 may receive as an input an intersection point for a path, an intersection time for the object to intersect with the vehicle, a probability of whether the object will follow the path, and one or more uncertainty values and output a probability that the object and the vehicle intersect along the path in the future. Of course, in other examples additional paths and associated intersection point(s) and intersection time(s) for the object may be provided as input to the model component 104.

In various examples, the model component 104 (or other model) can determine an uncertainty for whether the object will enter a region in the environment (e.g., an uncertainty that the object will enter a collision region). State data such as an object velocity data or object heading data can be input into a machine learned model to determine a collision region (or path) based at least in part on current data describing the state of the object. In this way, another less sophisticated model (e.g., a model that uses fewer or no machine learning algorithms relative to the machine learned model that determines the region or path) usable by a vehicle safety system can preemptively avoid an object based at least in part on determining a probability for the object to intersect with the collision region. In some examples, the less sophisticated model (e.g., the model component 104) may determine the probability for the object to intersect with the collision region based at least in part on an uncertainty value representing an uncertainty in the collision region, a heading of the object, and the like.

In some examples, a vehicle computing device may compare one or more outputs from a model (e.g., an output indicating a likelihood or probability that an object and a vehicle may intersect in the future) to a threshold probability, and determine whether to share, use, and/or further process the one or more outputs by the model with another component of the vehicle computing device. For instance, controlling a vehicle by the vehicle computing device may be based at least in part on an output from the model being equal to or less than the threshold probability.

Additionally or alternatively, any one or more of the probabilities determined above may be combined, for example, using Bayesian modeling, or otherwise, to determine an overall likelihood or probability of collision.

The vehicle computing device may, based at least in part on the information received from the model component 104, control the vehicle 102. For instance, controlling the vehicle 102 may comprise controlling at least one of: a braking system, an acceleration system, or a drive system of the vehicle (e.g., vehicle 502). In some examples, controlling the vehicle 102 by the vehicle computing device may comprise controlling the vehicle based at least in part on an indication of which objects in the environment 200A are most likely to collide with the vehicle 102.

In some examples, the model component 104 may define processing resources (e.g., processor amount, processor cycles, processor cores, processor location, processor type, and the like) to use to predict a possible collision with a detected object. A vehicle computing system and/or vehicle safety system that implements a model may have different processors (e.g., Central Processing Units (CPUs), Graphics Processing Units (GPUs), multi-core processor, and the like) and/or different memory (e.g., local and/or remote memory or varying size). Models may define processing resources to utilize a processor and/or a memory that most efficiently (e.g., uses the least amount of computational time) determines an output (e.g., a prediction). For example, the models may implement relatively simple algorithm to determine a path (e.g., path 202, path 204, path 206, path 208, and path 220) for an object or a probability associated with the object taking the path in the future. In this way, each model may be defined to utilize the processing resources and/or memory resources that enable the model to perform predictions in the least amount of time (e.g., to use the predicted behavior in planning considerations of the vehicle).

It should be understood that the number of paths in FIG. 2A are for the purpose of illustration. A different number of paths, probability(ies) that the object will follow each path, collision points, and/or intersection times may be determined by the vehicle 102 for any number of different objects in the environment 200A.

Figure 2B:
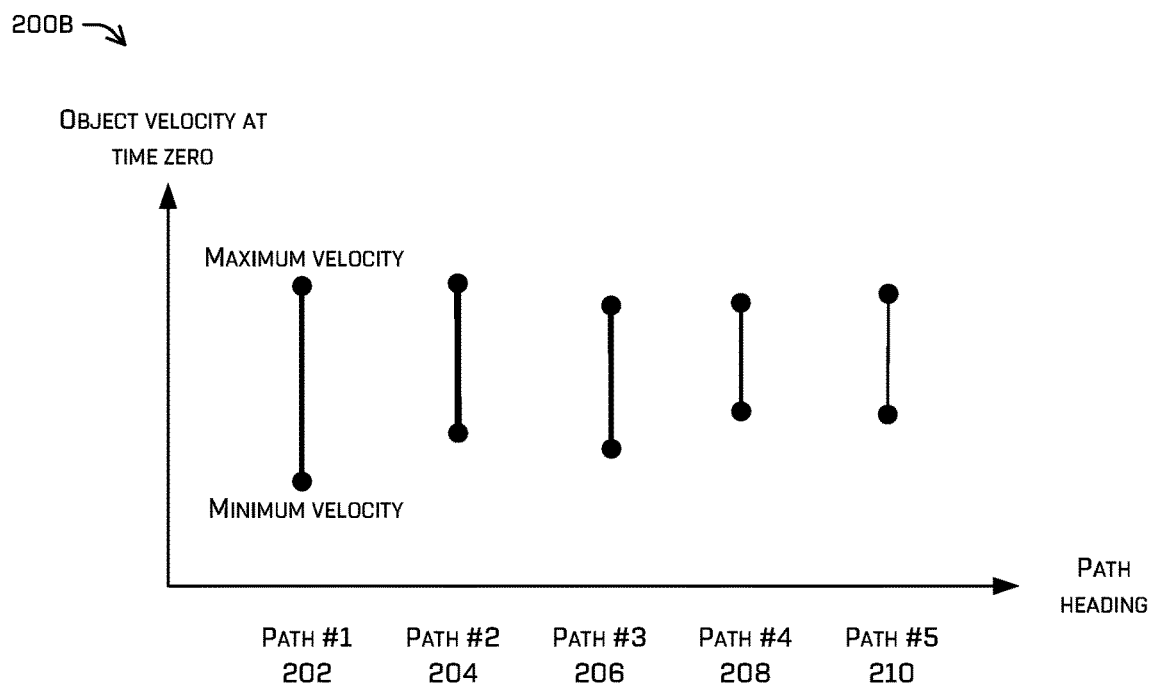
FIG. 2B is an illustration of an example implementation, in which one or more models determine a velocity for an object to intersect with a vehicle in an environment.

FIG. 2B is an illustration of an example implementation 200B, in which one or more models determine a velocity for an object to intersect with a vehicle in an environment. For instance, an example vehicle computing device (e.g., vehicle computing device 504) and/or an example vehicle safety system (e.g., vehicle safety system 534) may determine a velocity for an object (object 108) to collide with the vehicle (vehicle 102) along a path based on an intersection value (intersection value(s) 106) from an example model (model component 104).

In some examples, the vehicle safety system may determine a range of velocities for the vehicle 108 to collide with the vehicle 102 along each of the path 202, path 204, path 206, path 208, and path 210 (e.g., based on the heading of each respective path). As shown in FIG. 2B, a minimum velocity and a maximum velocity for the vehicle 108 to collide along the path 202 with the vehicle 102 may be determined (and so on for the other paths) by the vehicle safety system using equations of motion. In some examples, the vehicle safety system may determine a probability that the vehicle 108 and the vehicle 102 collide based at least in part on determining that a current velocity of the vehicle 108 is between the minimum velocity and the maximum velocity.

Figure 3:
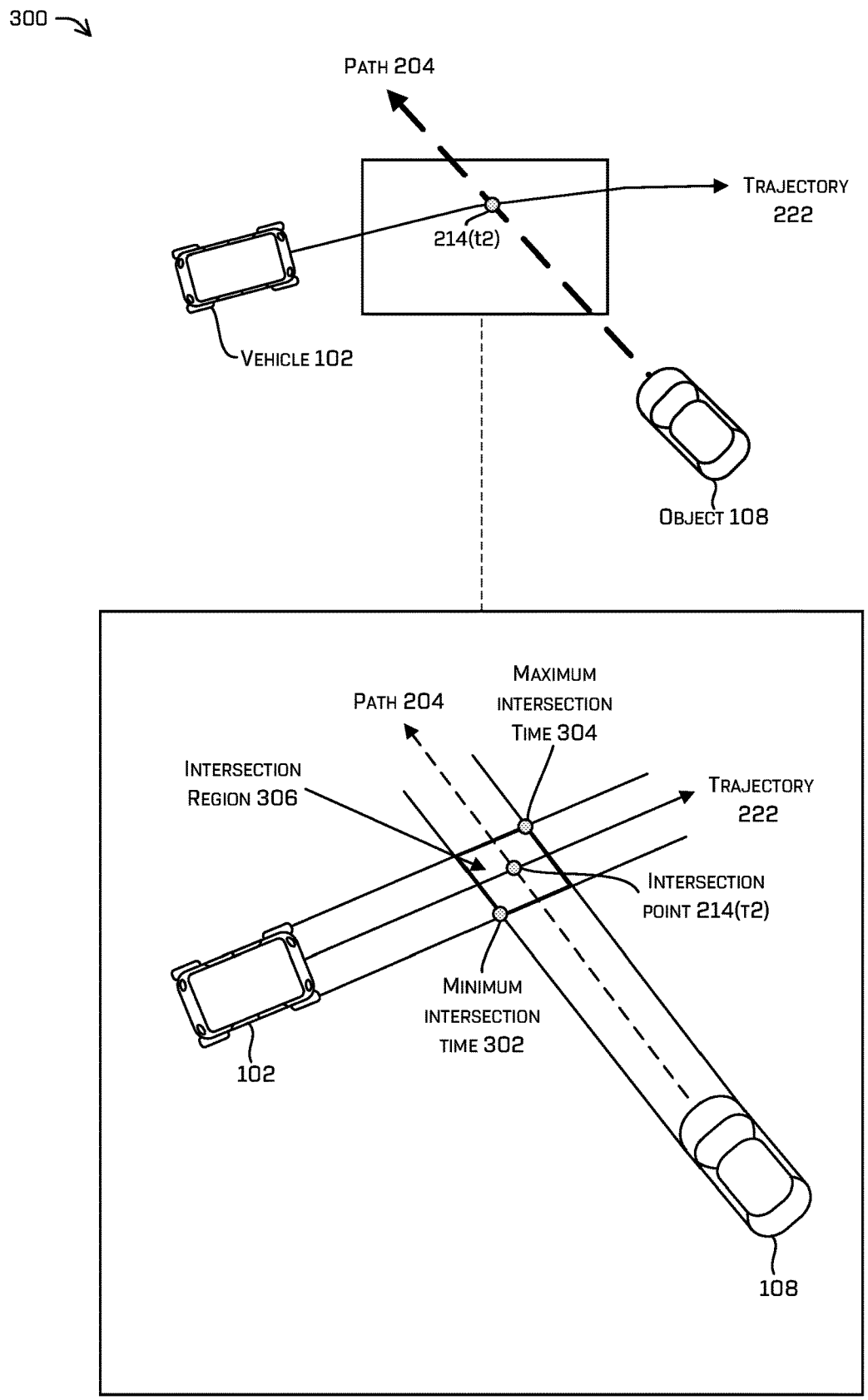
FIG. 3 is an illustration of an example implementation to determine a state representation of an object to cause an intersection with a vehicle based on an intersection value from an example model.

FIG. 3 is an illustration of an example implementation to determine a state representation of an object to cause an intersection with a vehicle based on an intersection value from an example model. For instance, an example vehicle computing device (e.g., vehicle computing device 504) and/or an example vehicle safety system (e.g., vehicle safety system 534) may determine states for an object (object 108) to collide with the vehicle (vehicle 102) along a path based on an intersection value (intersection value(s) 106) from an example model (model component 104).

As illustrated in FIG. 3, path 204 of the object 108 (e.g., vehicle 108) intersects with the vehicle 102 that is following trajectory 222 at collision point 214 at a future time t2. In some examples, the vehicle safety system may determine a minimum intersection time 302 and a maximum intersection time 304 based at least in part on state data (e.g., position data, vehicle width data, and so on) associated with the vehicle 108, the trajectory 222 associated with the vehicle 102, and/or width data associated with the vehicle 102. For instance, the vehicle safety system may determine the minimum intersection time 302 and the maximum intersection time 304 using standard equations related to dynamics, motion, geometry, and physics (e.g., for two-dimensions and/or three-dimensions).

In some examples, the vehicle safety system of the vehicle 102 may determine the collision region 306 of the path 204 based at least in part on one or more of: one or more collision points of the path 204, one or more intersection times of the path 204, a minimum velocity (or a minimum time) for the vehicle 108 to be in the collision region 306, and/or a maximum velocity (or maximum time) for the vehicle 108 to be in the collision region 306. Determining the probability of the collision between the vehicle 102 and the vehicle 108 may comprise, in some examples, determining that a current velocity of the vehicle 108 is between the minimum velocity for the vehicle 108 to be in the collision region 306 and the maximum velocity for the vehicle 108 to be in the collision region 306. The minimum time for the vehicle 108 to be in the collision region 306 and/or the maximum time for the vehicle 108 to be in the collision region 306 may also or instead be considered during intersection value determination.

Figure 4A:
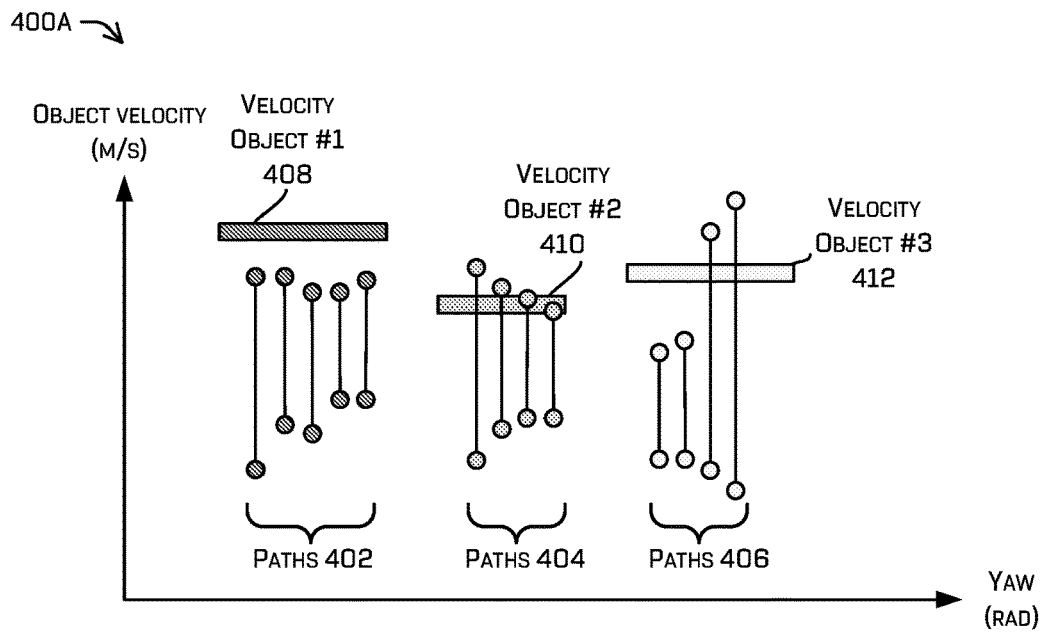
FIGS. 4A and 4B are illustrations of an example implementation, in which one or more models determine an intersection value indicating a likelihood for one or more example objects to collide with an example vehicle.
Figure 4B:
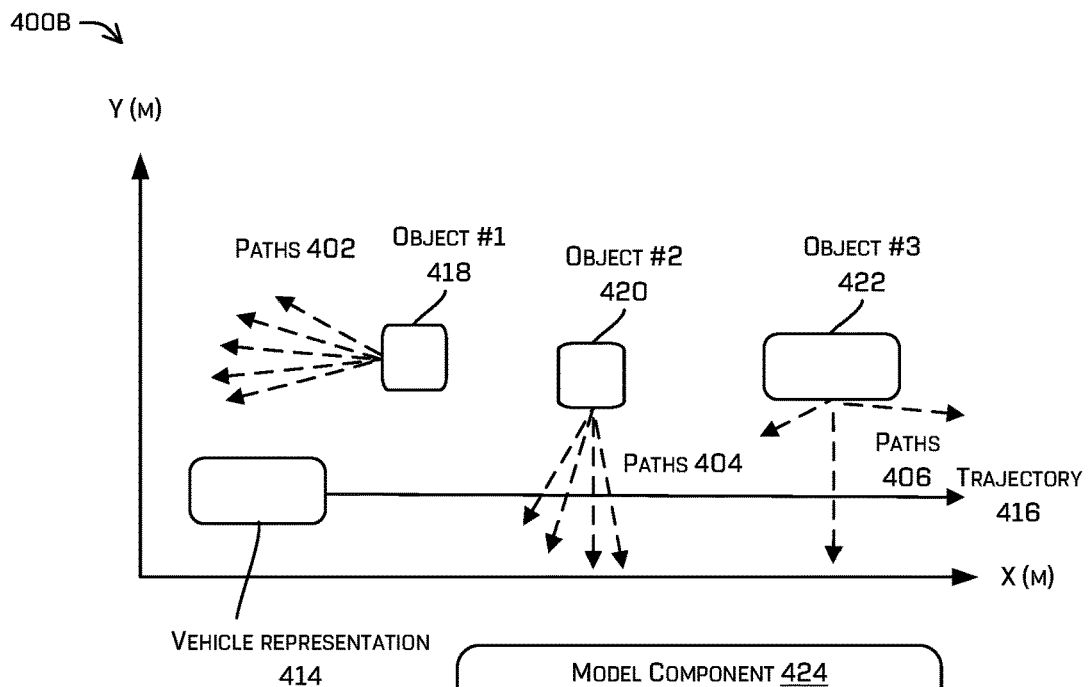
Figure 4B:
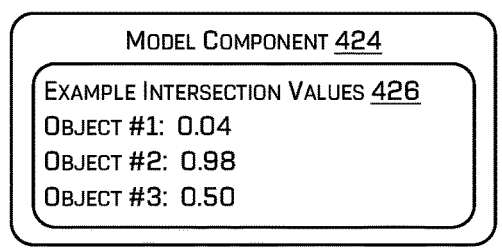

FIGS. 4A and 4B are illustrations of an example implementation 400A and 400B, in which one or more models determine an intersection value indicating a likelihood for one or more example objects to collide with an example vehicle.

In some examples, the model component 104 may determine paths 402 for a first object, paths 404 for a second object, and paths 406 for a third object in an environment of a vehicle, such as vehicle 102 in the environment 100. As shown in FIG. 4A, a path may be associated with a velocity range (e.g., a minimum velocity and a maximum velocity) to indicate a velocity of the object needed for an intersection with the vehicle 102. For instance, FIG. 4A depicts the paths 402 comprising five paths having a variety of velocity ranges. Depending on a given yaw of the object, the object may require different velocities to intersect with the vehicle 102.

FIG. 4A also illustrates a velocity for the first object (e.g., velocity object #1 408), a velocity for the second object (e.g., velocity object #2 410), a velocity for the third object (e.g., velocity object #3 412) as determined by state data associated with each respective object (e.g., first state data, second state data, third state data, etc.). That is, the object velocities (e.g., 408, 410, and 412) may represent a current velocity of the object. The velocity of the object, as shown in FIG. 4A, can be associated with a range of yaw values (e.g., a range of yaw data or yaw rate data) and may intersect with some, all, or none of the individual paths in each of the paths 402, the paths 404, and/or the paths 406. For example, given the current velocity of object #1 represented by the velocity of object #1 408, an intersection value output by the model component 108 would indicate a relatively low probability for collision with the vehicle 102 (compared to object #2) because the current velocity does not overlap with a range of velocities needed for the object to collide with the vehicle 102. Object #2, on the other hand, would likely be associated with an intersection value indicating a relatively high likelihood for an intersection with the vehicle 102 because the current velocity at least partially overlaps with a range of velocities for at least some of the paths in the paths 404.

Generally, FIG. 4B can represent objects (e.g., object 108, object 110, and object 112 in the environment 100) and associated paths relative to a trajectory 416 of the vehicle 102 in x-y space.

FIG. 4B illustrates a representation of the vehicle 102 (e.g., vehicle representation 414) as well as representations of object #1 (object 418), object #2 (object 420), and object #3 (object 422) usable by a model component 424 to determine intersection values 426 indicating a likelihood for each object to collide with the vehicle 102. The model component 424 may provide functionality similar to the model component 104, for example. As shown in FIG. 4B, the object 418 is associated with an intersection value of 0.04 (e.g., in a range of zero to one with a higher number indicating a greater likelihood of collision though a percentage or other numerical value are also contemplated) by the model component 424 based in least in part on the paths 402 of the object 418 being determined to not intersect with the trajectory 416. The object 420 has a relatively higher intersection value of 0.98 based on at least some of the paths 404 intersecting with the trajectory 416.

In various examples, the intersection values may be determined by the model component 104 using the following equation:

$$P(\text{intersection}) = \sum_{i=0}^{\#paths} P(A \in CSS_i \mid \text{path}_i) * P(\text{path}_i) \quad (2)$$

in which P (intersection) is the probability for a collision for an object, $\text{path}_i$ is the i-th possible path for the object, A is a state representation of the object, $CSS_i$ is a collision region for $\text{path}_i$, and $P(\text{path}_i)$ is the probability that the object follows $\text{path}_i$. In some examples, the state representation of the object may be based at least in part on state data associated with the object (e.g., position, velocity, yaw, etc.). The collision region(s) (e.g., collision region 306) may represent space at a current time that could cause a collision given a path of the object and a longitudinal equation, for example.

In some examples, a vehicle computing device and/or a vehicle safety system of the vehicle may send information indicative of the intersection values 426 to another component, such as the planning component 524 for use in planning operations (e.g., to determine a trajectory for the vehicle 102 to avoid the object 420) and/or a perception component 522 to modify downstream processing of the object 418, 420, and/or 422 (e.g., provide more or less perception processing to an object based on the intersection value). In this way, outputs by the model may be used to safely control the vehicle to a destination in the environment.

Figure 5:
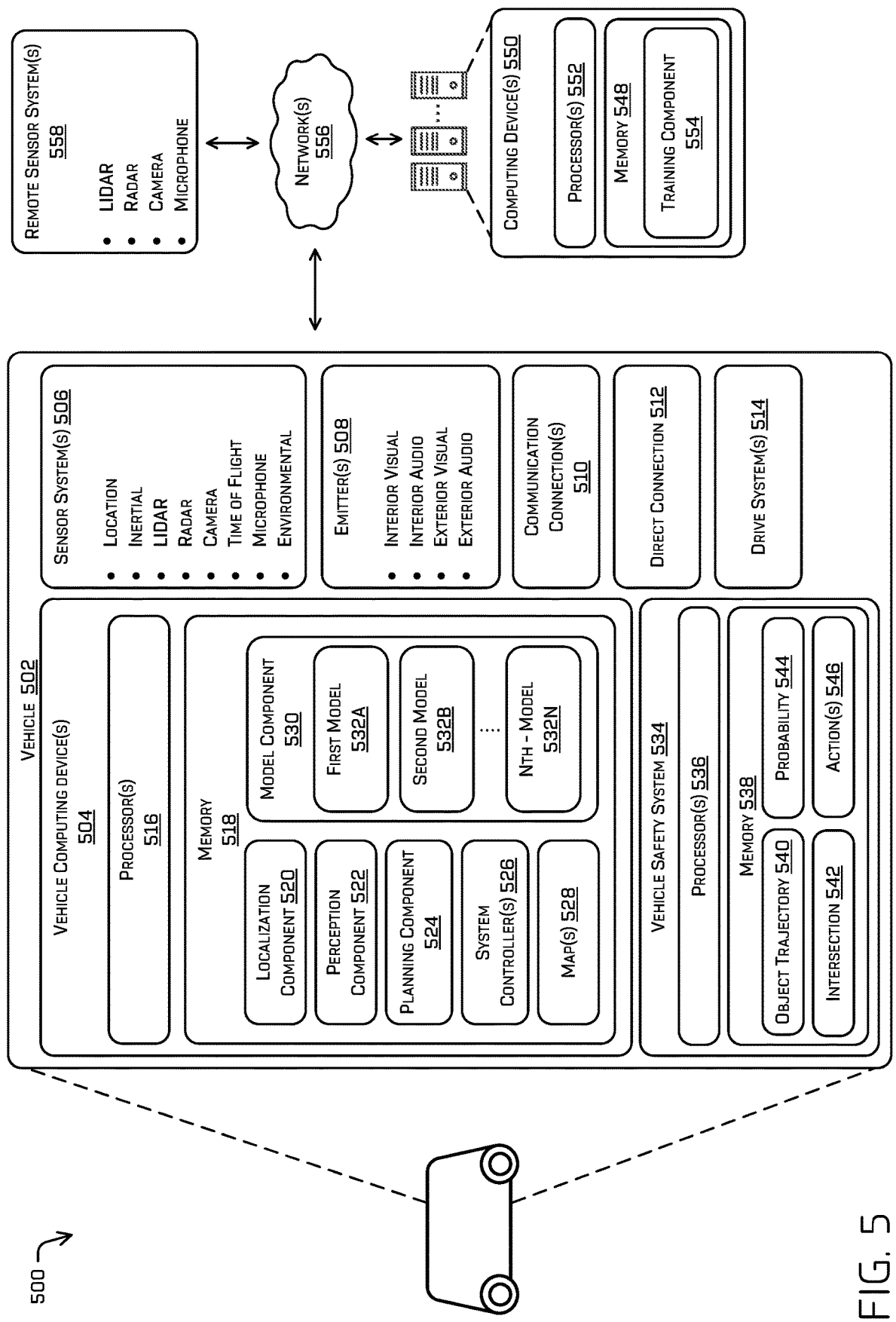
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device 504 (also referred to as a vehicle computing device 504 or vehicle computing device(s) 504), one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device 504 stores a localization component 520, a perception component 522, a planning component 524, one or more system controllers 526, one or more maps 528, and a model component 530 including one or more models, such as a first model 532A, a second model 532B, up to an Nth model 532N (collectively "models 532"), where N can be any integer greater than 1. Though depicted in FIG. 5 as residing in the memory 518 for illustrative purposes, it is contemplated that the localization component 520, the perception component 522, the planning component 524, the one or more system controllers 526, the one or more maps 528, and/or the model component 530 including the models 532 may additionally, or alternatively, be accessible to the vehicle 502 (e.g., stored on, or otherwise accessible by, memory remote from the vehicle 502, such as, for example, on memory 554 of a remote computing device 550).

Additionally, vehicle 502 may include a vehicle safety system 534, including an object trajectory component 540, an intersection component 542, a probability component 544, and an action component 546. As shown in this example, the vehicle safety system 534 may be implemented separately from the vehicle computing device(s) 504, for example, for improved performance of the vehicle safety system, and/or to provide redundancy, error checking, and/or validation of determinations and/or commands determined by the vehicle computing device(s) 504. However, in other examples, the vehicle safety system 534 may be implemented as one or more components within the same vehicle computing device(s) 504.

By way of example, the vehicle computing device(s) 504 may be considered to be a primary system, while the vehicle safety system 534 may be considered to be a secondary system. The primary system may generally perform processing to control how the vehicle maneuvers within an environment. The primary system may implement various artificial intelligence (AI) techniques, such as machine learning, to understand an environment around the vehicle 502 and/or instruct the vehicle 502 to move within the environment. For example, the primary system may implement the AI techniques to localize the vehicle, detect objects around the vehicle, segment sensor data, determine classifications of the objects, predict object tracks, generate trajectories for the vehicle 502 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 506.

In some examples, the vehicle safety system 534 may operate as separate system that receives state data (e.g., perception data) based on the sensor data and AI techniques implemented by the primary system (e.g., vehicle computing device(s) 504), and may perform various techniques described herein for improving collision prediction and avoidance by the vehicle 502. As described herein, the vehicle safety system 534 may implement techniques for predicting intersections/collisions based on sensor data, as well as probabilistic techniques that are based on positioning, velocity, acceleration, etc. of the vehicle and/or objects around the vehicle. In some examples, the vehicle safety system 534 may process data from sensors, such as a subset of sensor data that is processed by the primary system. To illustrate, the primary system may process lidar data, radar data, image data, depth data, etc., while the vehicle safety system 534 may process just lidar data and/or radar data (and/or time of flight data). In other examples, however, the vehicle safety system 534 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference for all purposes.

Although depicted in FIG. 5 as residing in the memory 518 for illustrative purposes, it is contemplated that the localization component 520, the perception component 522, the planning component 524, the model component 530, the system controllers 526, and the maps 528 may additionally, or alternatively, be accessible to the vehicle 502 (e.g., stored on, or otherwise accessible by, memory remote from the vehicle 502, such as, for example, on memory 548 of a remote computing device 550). Similarly, the although the object trajectory component 540, intersection component 542, probability component 544, and/or action component 546 are depicted as residing in the memory 538 of the vehicle safety system 534, one or more of these components may additionally, or alternatively, be implemented within vehicle computing device(s) 504 or may be accessible to the vehicle 502 (e.g., stored on, or otherwise accessible by, memory remote from the vehicle 502, such as, for example, on memory 548 of a remote computing device 550).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 528, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect or determine gravity, detect objects in an environment, generate routes, determine actions and/or trajectories to navigate within an environment.

In some examples, the one or more maps 528 may be stored on a remote computing device(s) (such as the computing device(s) 550) accessible via network(s) 556. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a model component 530. The model component 530 may be configured to determine intersection values for an object in an environment of the vehicle 502. In various examples, the model component 530 may receive sensor data associated with an object from the localization component 520, the perception component 522, and/or from the sensor system(s) 506. In some examples, the model component 530 may receive map data from the localization component 520, the perception component 522, the maps 528, and/or the sensor system(s) 506. While shown separately in FIG. 5, the model component 530 could be part of the localization component 520, the perception component 522, the planning component 524, or other component(s) of the vehicle 502.

In various examples, the model component 530 may send output(s) from the first model 532A, the second model 532B, and/or the Nth model 532N may be used by the perception component 522 to alter or modify an amount of perception performed in an area of the object based on an associated intersection value. In some examples, the planning component 524 may determine one or more actions (e.g., reference actions and/or sub-actions) for the vehicle 502 based at least in part on output(s) from the model component 530. In some examples, the model component 530 may be configured to output information indicating a probability that an object is likely to cause a collision. In some examples, the model component 530 may include at least the functionality provided by the model component 102 of FIG. 1 and/or the model component 424 of FIG. 4B.

In some examples, the model component 530 may communicate an output to the perception component 522 to cause an update to one or more parameters (e.g., bias values, drift values, and the like) associated with the sensor system(s) 506.

In various examples, the model component 530 may utilize machine learning techniques to determine an intersection value, as described with respect to FIG. 1 and elsewhere. In such examples, machine learning algorithms may be trained to predict a probability of an intersection while improving accuracy of the prediction.

The vehicle safety system 534 may include an object trajectory component 540 configured to determine a trajectory for the vehicle 502 and/or trajectories for other objects identifying within an environment, using the various systems and techniques described herein. In some examples, the object trajectory component 540 may receive planning data, perception data, and/or map data from the components 520-526 to determine a planned trajectory for the vehicle 502 and trajectories for the other objects in the environment.

In various examples, the object trajectory component 540 may generate a set of single points and/or pairs of related points (e.g., for a path polygon) representing a trajectory. In some examples the pairs of points and/or single points for a single trajectory may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a vehicle/object maneuvers, speeds, density of traffic in the environment, and/or other factors impacting the vehicle 502 or object for which the trajectory is determined.

In some examples, the object trajectory component 540 determine a single planned trajectory for the vehicle 502 (e.g., based on planning data and map data received from the planning component 524 and maps 530)), and may determine multiple trajectories for one or more other moving objects (e.g., vehicle 110) in the environment in which the vehicle 502 is operating. In some examples, the trajectories of another object may include any number of possible paths in which the object may travel from a current position (e.g., at the time of perception) and/or based on a direction of travel. Based on the determination that the agent is within the threshold distance or time to the vehicle 502, the object trajectory component 540 may determine the trajectories associated with the object. In some examples, the object trajectory component 540 may be configured to determine the possible trajectories of each detected moving object in the environment.

In various examples, the intersection component 542 may use the various techniques described herein to determine intersections between the trajectory of the vehicle 502 and/or one or more of the trajectories for other objects in the environment, to determine whether a potential collision zone may exist in the environment. A potential collision zone may include an area in which, based on the path polygon(s) and the trajectories, an intersection may occur between the vehicle 502 and an object (e.g., vehicle 110). In at least some examples, a trajectory for the object and object attributes (e.g., object size, position, orientation, pose, etc.) may be used to calculate an object polygon for the object. In such examples, a collision zone may be defined by the overlapping area between the path polygon for the vehicle 502 and the object polygon for the other object.

In some examples, the potential collision zone may exist between the vehicle 502 and the object if the trajectory associated with the vehicle 502 intersects with at least one trajectory associated with the object. In various examples, the intersection component 542 may determine that the potential collision zone may exist between the vehicle 502 and the object based on the vehicle and object trajectories being within a threshold distance (e.g., 2 feet, 3 feet, 4 meters, 5 meters, etc.). In some examples, the threshold distance may be based on a pre-defined distance. In various examples, the threshold distance may be determined based on a known or perceived width of the vehicle and/or of the object. In some examples, the threshold distance may be determined further a buffer, which may represent a safety buffer around the vehicle 502 and/or the object.

In some examples, the intersection component 542 may expand the edges of the vehicle trajectory and/or trajectories for the object, from the center of the vehicle 502 and object respectively, based on the known or perceived width of the vehicle and object. If the expanded width of the vehicle trajectory (or path polygon) and object trajectory (or path polygon) intersects and/or pass within a minimum allowable distance (e.g., 3 inches, 5 inches, 1 feet), the intersection component 542 may determine that the potential collision zone exists. If the expanded width of the vehicle trajectories and/or path polygons do not intersect and/or pass by more than the minimum allowable distance, the intersection component 542 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the intersection component 542 may be configured to determine the bounds of the potential collision zone. In some examples, the potential collision zone may include four elements, a vehicle enter point, a vehicle exit point, an object enter point, and an object exit point. Each of the vehicle 502 and object enter and exit points may include a position and distance. The object entry point and object exit point may include trajectory samples, such as trajectory samples, along the trajectory of the object. In some examples, object entry point and agent exit point may represent trajectory samples in which a risk of collision does not exist. In various examples, an object enter point position may be determined by identifying the last trajectory sample associated with the trajectory of the object prior to an intersection (e.g., convergence) with the trajectory or path polygon for the vehicle 502. In some examples, an object exit point position may be determined by identifying the first trajectory sample associated with the object trajectory after the convergence between the trajectory of the object and the trajectory or path polygon of the vehicle 502. The distance associated with object enter point and the object exit point may be derived from the respective positions as a distance along the trajectory.

The intersection component 542 may determine vehicle enter point and vehicle exit point positions based on an offset distance before and after the vehicle trajectory or path polygon. In some examples, the offset distance may include a distance measured perpendicular to the trajectory of the vehicle 502. In some examples, the offset distance may include a distance measured along the path polygon (e.g., vehicle path) before and after the trajectory. In various examples, the offset distance may be measured from the center of the path polygon. In some examples, the offset distance may be measured from a forward most point of the vehicle along the path polygon. In such examples, the offset distance may account for vehicle maneuvers (e.g., turns) and an affect thereof on a position of the vehicle 502.

As discussed above, in various examples the intersection component 542 may perform time-space overlap analysis on one or more potential collision zones (bounds thereof, such as the vehicle and object enter and exit points). In various examples, the time-space overlap may be represented as position cones associated with predicted object trajectories and the planned trajectory of the vehicle 502. In various examples, the intersection component 542 may be configured to determine a vehicle position cone and an agent position cone. The vehicle position cone may be determined based on probable velocities of the vehicle 502 along the planned trajectory (e.g., path polygon) through the potential collision zone. The object position cone may be determined based on probable velocities of the agent along the trajectory for the object associated with the potential collision zone.

In various examples, the probable velocities of the object may be derived from probable accelerations (e.g., positive and negative accelerations) of the intersection component 542. The accelerations may include positive accelerations based on a fast-behavioral model (e.g., aggressive behavior) and negative accelerations based on a slow-behavioral model (e.g., conservative behavior). In various examples, the positive accelerations associated with the object may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the object may represent a maximum amount of negative acceleration probable in the environment, such as that based on the initial velocity of the object.

In various examples, intersection component 542 may determine position lines and/or position cones for the object and the vehicle 502 respective to the potential collision zone. The position lines and/or cones for the vehicle 502 and the object may be based on the object entry time, object exit time, vehicle entry time, and vehicle exit time with respect to the potential collision zone. In such examples, the entry times into the potential collision zone may be associated with a most aggressive estimation of speed. In various examples, the object exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the object based on time. The probable positions of the object may be derived from probable accelerations, and speeds derived therefrom and/or outputs of other systems or subsystems (e.g., a prediction system, which may be, for example, a subsystem of the perception component 522). The probability density functions may represent aggressive and conservative driving speeds, as well as uncertainties based on accelerations of the object, such as those based on traffic laws, rules of the road, local driving etiquette, traffic patterns, semantic classification of the agent, or the like. The probability density functions may represent two-dimensional area or three-dimensional areas associated with the object. The total sum of the area under a curve of a probability density function may equal 1.

In various examples, probability component 544 may determine a prediction of an intersection between the vehicle 502 and/or the other object (e.g., vehicle 110) and/or a probability/risk of collision, based on the time-space overlap analyses performed by the intersection component 542. In some examples, the probability component 544 may determine a probability of an intersection based on a single trajectory of the vehicle 502 and a single trajectory of the object, based on an overlap between position lines and/or position cones of the vehicle 502 and object with respect to the potential collision zone. For instance, based on where in the potential collision zone that the position lines overlap, and/or the amount of overlap between the position cones (e.g., the time gap, percentage of cone overlap, etc.), the probability component 544 may determine that a risk of collision may be relatively high, medium, or low.

Additionally, using the various techniques described herein, the probability component 544 also may determine a probability of an intersection between the vehicle 502 and an object, based on the planned trajectory of the vehicle 502 and multiple trajectories of the object. For example, the intersection component 542 may analyze multiple trajectories of the object (e.g., based on perturbations of the object state parameters), and the probability component 544 may determine a single collision prediction based on the results of the analyses the multiple trajectories. In some cases, the probability component 544 may determine an intersection probability based on the percentage (or ratio) of trajectories for the object that are determined to intersect or collide with the vehicle 502 based on the planned vehicle trajectory.

In various examples, the action component 546 may determine one or more actions for the vehicle 502 to take, based on predictions and/or probability determinations of an intersection between the vehicle 502 another object (e.g., vehicle 106), along with other factors. The action may include slowing the vehicle to yield to the object, stopping the vehicle to yield to the object, changing lanes or swerving left, or changing or swerving lanes right, etc. Based on the determined action, the vehicle computing device(s) 504, such as through the system controller(s) 528, may cause the vehicle 502 to perform the action. In at least some examples, such an action may be based on the probability of collision, determined by the probability component 544 based on multiple trajectories for the object, as described in detail. In various examples, responsive to determining to adjust a lateral position of the vehicle, such as in a lane change to the left or to the right, the vehicle safety system 534 may cause the components 540-546 to generate an updated vehicle trajectory (or path polygon), plot additional object trajectories with respect to the updated vehicle trajectory, determine updated potential collision zones, and perform time-space overlap analyses to determine whether an intersection risk may still exist after the determined action is performed by the vehicle 502.

As can be understood, the components discussed herein (e.g., the localization component 520, the perception component 522, the planning component 524, the prediction component 526, the one or more system controllers 528, the one or more maps 530, and the vehicle safety system 534 including the object trajectory component 540, the intersection component 542, the probability component 544, and the action component 546 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 518 (and the memory 548, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 556, to the one or more computing device(s) 550 at a particular frequency, after a lapse of a predetermined period of time, in near real-time, etc. In some examples, the model component 530 may receive sensor data from one or more of the sensor system(s) 506.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 550, other nearby vehicles, etc.) and/or one or more remote sensor system(s) 558 for receiving sensor data. The communication connection(s) 510 also enable the vehicle 502 to communicate with a remote teleoperations computing device or other remote services.

The communication connection(s) 510 may include physical and/or logical interfaces for connecting the vehicle computing device 504 to another computing device or a network, such as network(s) 556. For example, the communication connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 556, to the computing device(s) 550. In at least one example, the localization component 520, the perception component 522, the planning component 524, the one or more system controllers 526, the one or more maps 528, and the model component 530 may send their respective outputs to the remote computing device(s) 550 at a particular frequency, after a lapse of a predetermined period of time, in near real-time, etc.

In some examples, the vehicle 502 may send sensor data to the computing device(s) 550 via the network(s) 556. In some examples, the vehicle 502 may receive sensor data from the computing device(s) 550 and/or remote sensor system(s) 558 via the network(s) 556. The sensor data may include raw sensor data and/or processed sensor data and/or representations of sensor data. In some examples, the sensor data (raw or processed) may be sent and/or received as one or more log files.

The computing device(s) 550 may include processor(s) 552 and a memory 548 storing a training component 554.

In some instances, the training component 554 can include functionality to train a machine learning model to output classification values. For example, the training component 554 can receive data that represents labelled collision data (e.g. publicly available data, sensor data, and/or a combination thereof). At least a portion of the data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 554 can be trained to output intersection values associated with objects, as discussed herein.

In some examples, the training component 554 can include training data that has been generated by a simulator. For example, simulated training data can represent examples where a vehicle collides with an object in an environment or nearly collides with an object in an environment, to provide additional training examples.

In some examples, functionality provided by the training component 554 may be included and/or performed by the vehicle computing device 504.

The processor(s) 516 of the vehicle 502, processor(s) 536 of the vehicle safety system 534, and/or the processor(s) 552 of the computing device(s) 550 may be any suitable processor capable of executing instructions to process data and perform operations as described herein. By way of example and not limitation, the processor(s) 516, 536, and 552 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518, memory 548, and memory 554 are examples of non-transitory computer-readable media. The memory 518, the memory 548, and/or memory 554 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518, the memory 548, and memory 554 may include at least a working memory and a storage memory. For example, the working memory may be a high-speed memory of limited capacity (e.g., cache memory) that is used for storing data to be operated on by the processor(s) 516, 536, and/or 552. In some instances, the memory 518, the memory 548, and memory 554 may include a storage memory that may be a lower-speed memory of relatively large capacity that is used for long-term storage of data. In some cases, the processor(s) 516, 536, and/or 552 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 550 and/or components of the computing device(s) 550 may be associated with the vehicle 502. That is, the vehicle 502 may perform one or more of the functions associated with the computing device(s) 550, and vice versa. For instance, either the vehicle 502 and/or the computing device(s) 550 may perform training operations relating to one or more of the models described herein.

Figure 6A:
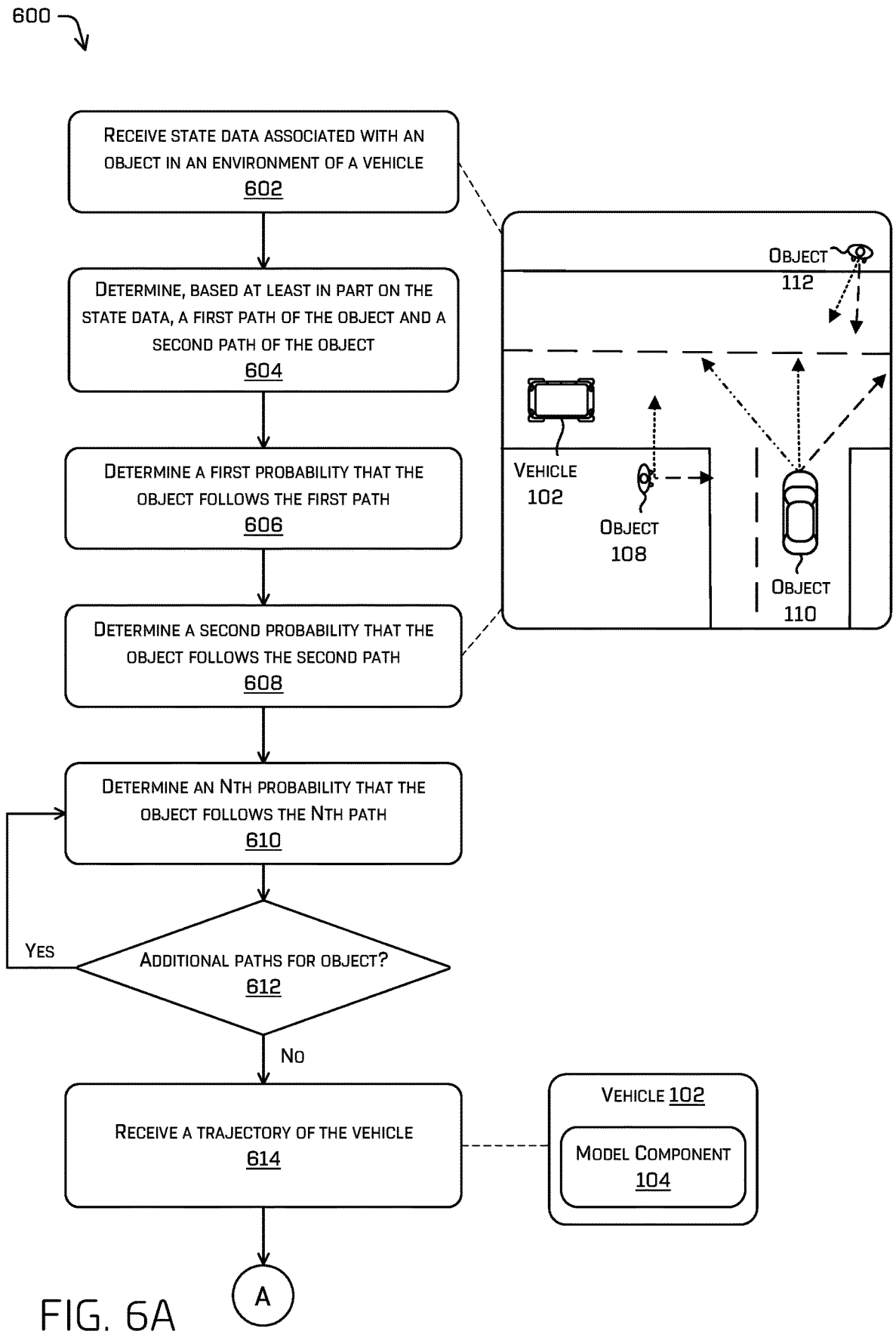
FIG. 6A is a first part of a flowchart depicting an example process for determining probability of intersection using one or more example models.
Figure 6B:
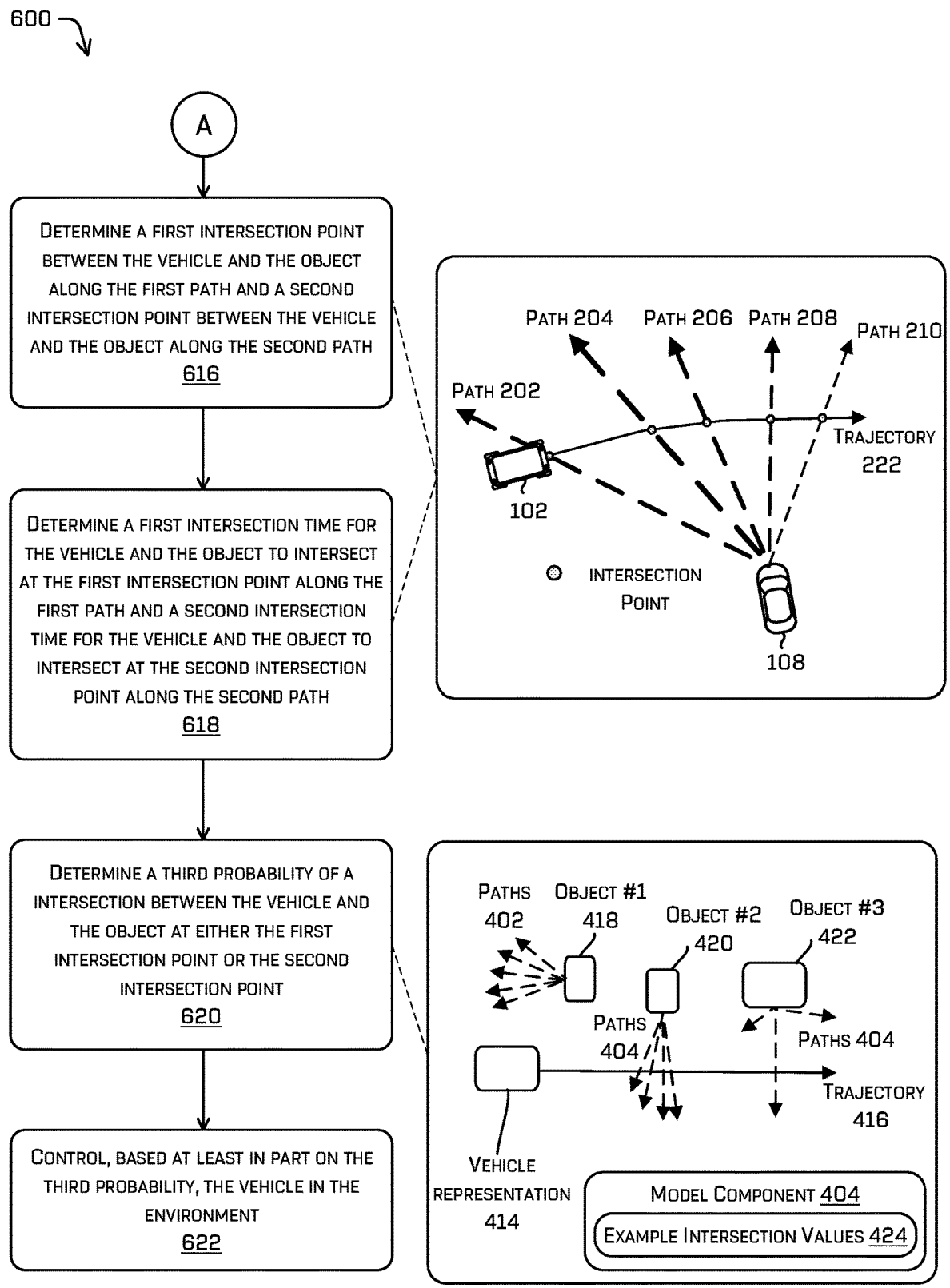
FIG. 6B is a second part of the flowchart depicting the example process for determining probability of intersection using one or more example models.

FIG. 6A is a first part of a flowchart depicting an example process 600 for determining probability of collision using one or more example models. FIG. 6B is a second part of the flowchart depicting the example process 600 for determining probability of collision using one or more example models. Some or all of the process 600 may be performed by one or more components in FIG. 5, as described herein. For example, some or all of process 600 may be performed by the vehicle computing device 504 and/or the vehicle safety system 534.

At operation 602, the process may include receiving state data associated with an object in an environment of a vehicle. In some examples, the operation 602 may include capturing sensor data associated with one or more objects in an environment of the vehicle 102. The one or more objects may represent a pedestrian, a group of pedestrians, another vehicle, and so on. The sensor data may be received from one or more sensors on the vehicle and/or from one or more remote sensors. The vehicle computing device may detect, infer, estimate, or otherwise determine state data representing characteristics of the object in the environment based at least in part on the sensor data.

At operation 604, the process may include determining, based at least in part on the state data, a first path of the object and a second path of the object, the second path being different than the first path. In some examples, the operation 604 may include a vehicle computing device determining two or more paths for an object to collide with the vehicle based on the state data (e.g., position data, yaw data, velocity data, etc.) of the object.

At operation 606, the process may include determining a first probability that the object follows the first path. In some examples, the operation 606 may include the model component 104 outputting a first value to indicate a first probability that the object follows the first path. In various examples, the vehicle computing device may implement a machine learned model to output one or more values indicative of a likelihood or probability that the object follows a path (or an additional path in a set of paths). In some examples, the functionality provided by the machine learned model may be implemented by the model component 104. In at least some examples, such probabilities may be used to determine one or more additional paths associated with the object such as, for example, by determining a distribution of other paths relative to the predicted path based at least in part on the uncertainty in any parameter (e.g., heading).

At operation 608, the process may include determining a second probability that the object follows the second path. In some examples, the operation 608 may include the model component 104 outputting a second value to indicate a second probability that the object follows the first path.

At operation 610, the process may include determining an Nth probability that the object follows the Nth path. In some examples, the operation 608 may include the model component 104 outputting an Nth value to indicate a probability that the object follows the Nth path (where N can be any integer greater than 1).

At operation 612, the process may include determining whether additional paths are determined for the object. For instance, a vehicle computing device of the vehicle may compute a predetermined number paths (e.g., 1, 2, 3, and so on) for each object detected by the vehicle 102. The operation 612 may be followed by the operation 604 if the predetermined number of paths is determined not to meet or exceed a threshold value (e.g., "yes" in the operation 612). The operation 612 may continue to operation 614 if the predetermined number of paths is determined to meet or exceed the threshold value (e.g., "no" in the operation 612).

At operation 614, the process may include receiving a trajectory of the vehicle. In some examples, the operation 614 may include receiving a trajectory from the planned component 524 of the vehicle computing device 504.

At operation 616, the process may include determining a first collision point between the vehicle and the object along the first path and a second collision point between the vehicle and the object along the second path. In some examples, the operation 616 may include the vehicle computing device using the trajectory of the vehicle 102 to compute the first collision point and the second collision point, as discussed herein. In some examples, multiple collision points may be determined by the vehicle computing device for each object path.

At operation 618, the process may include determining a first intersection time for the vehicle and the object to collide at the first collision point along the first path and a second intersection time for the vehicle and the object to collide at the second collision point along the second path. In some examples, the operation 618 may include the vehicle computing device using the trajectory of the vehicle 102 to compute the first intersection time and the second intersection time, as discussed herein. In some examples, multiple intersection times may be determined by the vehicle computing device for each object path. In some examples, the vehicle computing device may determine a collision region based at least in part on the one or more collision points and one or more intersection times associated with each object path.

At operation 620, the process may include determining a third probability of an intersection between the vehicle and the object at either the first collision point or the second collision point. In some examples, the operation 620 may include the vehicle computing device determining the third probability based at least in part on the first probability, the second probability, the first collision point, the second collision point, the first intersection time, and the second intersection time.

At operation 622, the process may include controlling, based at least in part on the third probability, the vehicle in the environment. In some examples, the operation 622 may include controlling the vehicle 102 based on one or more intersection values from the model component 104. For instance, the intersection values output by the model component 104 may be used by a perception component (e.g., perception component 522) and/or a planning component (e.g., planning component 524). In some examples, the operation 622 may include determining a trajectory of the vehicle 102 based on the intersection value(s) 106. The vehicle 102 may be controlled to move according to (e.g., follow) the trajectory.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 602, 604, 606, 608, 614, 616, 618, and 620 may be performed without operation 622. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving state data associated with an object in an environment proximate a vehicle, the state data comprising a heading uncertainty, a velocity uncertainty, and a probability the object is following a path; determining, based at least in part on the heading uncertainty and the path, a first potential path of the object and a second potential path of the object, the first potential path associated with a first probability that the object follows the first potential path and the second potential path associated with a second probability that the object follows the second potential path; receiving a trajectory of the vehicle; determining, based at least in part on the trajectory of the vehicle and the velocity uncertainty, a first intersection point between the trajectory and the first potential path and a second intersection point between the trajectory and the second potential path; determining, based at least in part on the first probability, the second probability, and the velocity uncertainty, an intersection probability between the vehicle and the object at either the first intersection point or the second intersection point; and controlling, based at least in part on the intersection probability, the vehicle in the environment.

B: A system as paragraph A describes, wherein the object is a first object and further comprising: detecting a second object, the second object associated with second state data, second heading uncertainty, and second velocity uncertainty; determining, based at least in part on the second state data, a third path of the second object and a fourth path of the second object, the third path associated with a fourth probability and the fourth path associated with a fifth probability; determining, based at least in part on the fourth probability the fifth probability, a second intersection probability between the vehicle and the second object; and determining the second intersection probability is less than or equal to a threshold probability, wherein controlling the vehicle is independent of the second object.

C: A system as paragraphs A or B describe, wherein determining the first and second potential paths comprise: determining, based at least in part on the heading uncertainty, a distribution of paths about the path; and determining, as the first and second potential paths, two paths from the distribution of paths.

D: A system as paragraphs A-C describe, further comprising: determining, based at least in part on a minimum velocity, a first time associated with the object and the vehicle being in a collision region; and determining, based at least in part on a maximum velocity, a second time associated with the object and the vehicle being in the collision region, wherein determining the intersection probability comprises determining that a current velocity of the object is between the minimum velocity and the maximum velocity.

E: A system as paragraphs A-D describe, wherein the velocity uncertainty is based at least in part on a time to intersection and one or more of a position uncertainty or an acceleration uncertainty.

F: A method comprising: receiving a first set of paths associated with a first object in an environment proximate a vehicle; receiving a second set of paths associated with a second object in the environment; receiving a trajectory associated with the vehicle; determining a first intersection point between the trajectory and a path of the first set of paths and a second intersection point between the trajectory and a path of the second set of paths; determining, based at least in part on the first intersection point, a first intersection probability between the vehicle and the first object; determining, based at least in part on the second intersection point, a second intersection probability between the vehicle and the second object; and controlling the vehicle based at least in part on the first intersection probability or the second intersection probability.

G: A method as paragraph F describes, further comprising: receiving state data associated with the first object; determining, based at least in part on the state data, an uncertainty value associated with at least one of: a position of the first object, a heading of the first object, an acceleration of the first object, or a trajectory of the vehicle, and wherein determining the first intersection probability is based at least in part on the uncertainty value.

H: A method as paragraphs F or G describe, further comprising: determining, based at least in part on the first intersection point, a first range of velocities associated with the first object; and determining, based at least in part on the second intersection point, a second range of velocities associated with the second object, wherein determining the first intersection probability and the second intersection probability is based at least in part on the first range of velocities associated with the first object, the second range of velocities associated with the second object, a velocity of the first object, and a velocity of the second object.

I: A method as paragraphs F-H describe, wherein determining the first range of velocities comprises: determining, based on a size of an intersection region associated with the first intersection point, a first time for the first object to intersect with the trajectory of the vehicle and a second time for the first object to intersect with the trajectory of the vehicle; and determining, based at least in part on the first time and the second time, a first velocity of the first object to reach the first intersection point and a second velocity of the first object to reach the second intersection point, wherein the first range of velocities is defined by velocities from the first velocity to the second velocity.

J: A method as paragraphs F-I describe, wherein the first intersection probability is based at least in part on a velocity uncertainty associated with the first object, and wherein the velocity uncertainty is based at least in part on the first time and one or more of a position uncertainty or an acceleration uncertainty.

K: A method as paragraphs F-J describe, wherein the first set of paths is determined based at least in part on a heading uncertainty associated with the first object.

L: A method as paragraphs F-K describe, wherein the first set of paths and the second set of paths are received from a machine learning model implementing a machine learning algorithm.

M: A method as paragraphs F-L describe, further comprising: inputting the first intersection probability, the second intersection probability, and information about at least one of the first object or the second object into a model; receiving, from the model, an indication of an amount of computational processing to dedicate to first object or the second object.

N: A method as paragraphs F-M describe, further comprising: inputting the first intersection probability, the second intersection probability, and information about at least one of the first object or the second object into a model; receiving, from the model, an indication to apply a different level of computational processing to the first object relative to the second object.

O: A method as paragraphs F-N describe, wherein determining the first intersection probability is based at least in part on a velocity of the first object.

P: A method as paragraphs F-O describe, wherein the path of the first set of paths represents a substantially straight line.

Q: One or more non-transitory computer-readable media storing instructions executable by a processor, wherein the instructions, when executed, cause the processor to perform operations comprising: receiving a set of paths associated with an object in an environment proximate a vehicle, the set of paths comprising a distribution of paths based at least in part on an uncertainty associated with the object; receiving a trajectory associated with the vehicle; determining an intersection point between the trajectory and a path of the set of paths; determining, based at least in part on the intersection point, an intersection probability between the vehicle and the object; and controlling the vehicle based at least in part on the intersection probability.

R: One or more non-transitory computer-readable media as paragraph Q describes, further comprising: determining, based at least in part on an intersection region associated with the intersection point, a range of velocities associated with the intersection region; determining, based at least in part on the range of velocities, a probability associated with the object being in the intersection region contemporaneously with the vehicle, wherein the intersection probability is determined based at least in part on a product of a probability associated with the path and the probability associated with the object being in the intersection region.

S: One or more non-transitory computer-readable media as paragraphs Q or R describe, the operations further comprising: receiving, state data associated with the object, the state data comprising an uncertainty value associated with at least one of: a position of the object, a heading of the object, or an acceleration of the object, wherein determining the intersection probability is based at least in part on the uncertainty value.

T: One or more non-transitory computer-readable media as paragraphs Q-S describe, the operations further comprising: receiving an additional set of paths associated with an additional object in the environment proximate the vehicle, the additional set of paths comprising an additional distribution of paths based at least in part on an uncertainty associated with the additional object; determining an additional intersection point between the trajectory and a path of the additional set of paths; and determining, based at least in part on the additional intersection point, an additional intersection probability between the vehicle and the additional object, wherein controlling the vehicle is independent of the additional object based at least in part on the additional intersection probability being less than or equal to a threshold probability.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving state data associated with an object in an environment proximate to a vehicle, the state data comprising a heading uncertainty, a velocity uncertainty, and a probability the object is following a path;
determining, based at least in part on the heading uncertainty and the path, a first potential path of the object and a second potential path of the object, the first potential path associated with a first probability that the object follows the first potential path and the second potential path associated with a second probability that the object follows the second potential path;
receiving a trajectory of the vehicle;
determining, based at least in part on the trajectory of the vehicle and the velocity uncertainty, a first intersection point between the trajectory and the first potential path and a second intersection point between the trajectory and the second potential path;
determining, based at least in part on the first intersection point, a range of velocities associated with the object, wherein determining the range of velocities comprises:
determining a first time for the object to intersect with the trajectory of the vehicle and a second time for the object to intersect with the trajectory of the vehicle; and
determining, based at least in part on the first time and the second time, a first velocity of the object to reach the first intersection point and a second velocity of the object to reach the second intersection point;
determining, based at least in part on the range of velocities associated with the object, the first probability;
determining, based at least in part on the first probability, the second probability, and the velocity uncertainty, an intersection probability between the vehicle and the object at either the first intersection point or the second intersection point; and
controlling, based at least in part on the intersection probability, the vehicle in the environment.

2. The system of claim 1, wherein the object is a first object and the operations further comprise:
detecting a second object, the second object associated with second state data, a second heading uncertainty, and a second velocity uncertainty;
determining, based at least in part on the second state data, a third path of the second object and a fourth path of the second object, the third path associated with a fourth probability and the fourth path associated with a fifth probability;
determining, based at least in part on the fourth probability the fifth probability, a second intersection probability between the vehicle and the second object; and
determining the second intersection probability is less than or equal to a threshold probability,
wherein controlling the vehicle is independent of the second object.

3. The system of claim 1, wherein determining the first and second potential paths comprise:
determining, based at least in part on the heading uncertainty, a distribution of paths about the path; and
determining, as the first and second potential paths, two paths from the distribution of paths.

4. The system of claim 1, the operations further comprising:
determining, based at least in part on a minimum velocity, a third time associated with the object and the vehicle being in a collision region; and
determining, based at least in part on a maximum velocity, a fourth time associated with the object and the vehicle being in the collision region, wherein determining the intersection probability comprises determining that a current velocity of the object is between the minimum velocity and the maximum velocity.

5. The system of claim 1, wherein the velocity uncertainty is based at least in part on a time to intersection and one or more of a position uncertainty or an acceleration uncertainty.

6. A method comprising:
receiving a first set of paths associated with a first object in an environment proximate to a vehicle;
receiving a second set of paths associated with a second object in the environment;
receiving a trajectory associated with the vehicle;
determining a first intersection point between the trajectory and a path of the first set of paths and a second intersection point between the trajectory and a path of the second set of paths;
determining, based at least in part on the first intersection point, a first intersection probability between the vehicle and the first object;
determining, based at least in part on the first intersection point, a range of velocities associated with the first object, wherein determining the range of velocities comprises:
determining a first time for the first object to intersect with the trajectory of the vehicle and a second time for the first object to intersect with the trajectory of the vehicle; and
determining, based at least in part on the first time and the second time, a first velocity and a second velocity of the first object to reach corresponding intersection points between the trajectory and the path of the first set of paths;
determining, based at least in part on the second intersection point, a second intersection probability between the vehicle and the second object; and
controlling the vehicle based at least in part on the first intersection probability or the second intersection probability.

7. The method of claim 6, further comprising:
receiving state data associated with the first object;
determining, based at least in part on the state data, an uncertainty value associated with at least one of: a position of the first object, a heading of the first object, an acceleration of the first object, or the trajectory of the vehicle, wherein determining the first intersection probability is based at least in part on the uncertainty value.

8. The method of claim 6, further comprising:
determining, based at least in part on the second intersection point, a second range of velocities associated with the second object, wherein determining the first intersection probability and the second intersection probability is based at least in part on the first range of velocities associated with the first object, the second range of velocities associated with the second object, a velocity of the first object, and a velocity of the second object.

9. The method of claim 6, wherein the first intersection probability is based at least in part on a velocity uncertainty associated with the first object, and wherein the velocity uncertainty is based at least in part on the first time and one or more of a position uncertainty or an acceleration uncertainty.

10. The method of claim 6, wherein the first set of paths is determined based at least in part on a heading uncertainty associated with the first object.

11. The method of claim 6, wherein the first set of paths and the second set of paths are received from a machine learning model implementing a machine learning algorithm.

12. The method of claim 6, further comprising:
inputting the first intersection probability, the second intersection probability, and information about at least one of the first object or the second object into a model;
receiving, from the model, an indication of an amount of computational processing to dedicate to first object or the second object.

13. The method of claim 6, further comprising:
inputting the first intersection probability, the second intersection probability, and information about at least one of the first object or the second object into a model;
receiving, from the model, an indication to apply a different level of computational processing to the first object relative to the second object.

14. The method of claim 6, wherein determining the first intersection probability is based at least in part on a velocity of the first object.

15. The method of claim 6, wherein the path of the first set of paths represents a substantially straight line.

16. One or more non-transitory computer-readable media storing instructions executable by a processor, wherein the instructions, when executed, cause the processor to perform operations comprising:
receiving a set of paths associated with an object in an environment proximate to a vehicle, the set of paths comprising a distribution of paths based at least in part on an uncertainty associated with the object;
receiving a trajectory associated with the vehicle;
determining an intersection point between the trajectory and a path of the set of paths;
determining, based at least in part on the intersection point, a range of velocities associated with the object, wherein the intersection point comprises a first intersection point and a second intersection point, and determining the range of velocities comprises:
determining a first time for the object to intersect with the trajectory of the vehicle and a second time for the object to intersect with the trajectory of the vehicle; and
determining, based at least in part on the first time and the second time, a first velocity of the object to reach the first intersection point and a second velocity of the object to reach the second intersection point;
determining, based at least in part on the range of velocities associated with the object, a first probability that the object follows the path;
determining, based at least in part on the first probability, an intersection probability between the vehicle and the object; and
controlling the vehicle based at least in part on the intersection probability.

17. The one or more non-transitory computer-readable media of claim 16, the operations further comprising:
determining, based at least in part on an intersection region associated with the intersection point, a range of velocities associated with the intersection region;
determining, based at least in part on the range of velocities associated with the intersection region, a probability associated with the object being in the intersection region contemporaneously with the vehicle,
wherein the intersection probability is determined based at least in part on a product of a probability associated with the path and the probability associated with the object being in the intersection region.

18. The one or more non-transitory computer-readable media of claim 17, the operations further comprising:
receiving an additional set of paths associated with an additional object in the environment proximate to the vehicle, the additional set of paths comprising an additional distribution of paths based at least in part on an uncertainty associated with the additional object;
determining an additional intersection point between the trajectory and a path of the additional set of paths; and
determining, based at least in part on the additional intersection point, an additional intersection probability between the vehicle and the additional object,
wherein controlling the vehicle is independent of the additional object based at least in part on the additional intersection probability being less than or equal to a threshold probability.

19. The one or more non-transitory computer-readable media of claim 16, the operations further comprising:
receiving, state data associated with the object, the state data comprising an uncertainty value associated with at least one of: a position of the object, a heading of the object, or an acceleration of the object,
wherein determining the intersection probability is further based at least in part on the uncertainty value.

20. The one or more non-transitory computer-readable media of claim 16, wherein the set of paths is determined based at least in part on a heading uncertainty associated with the object.

* * * * *